US008990315B2

(12) United States Patent
Bhogal et al.

(10) Patent No.: US 8,990,315 B2
(45) Date of Patent: Mar. 24, 2015

(54) SENDING MESSAGES WITH LIMITED AWARENESS OF RECIPIENTS

(75) Inventors: Kulvir S. Bhogal, Pflugerville, TX (US); Lisa Seacat DeLuca, San Francisco, CA (US); Robert R. Peterson, Austin, TX (US); Mark W. Talbot, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 771 days.

(21) Appl. No.: 12/720,577

(22) Filed: Mar. 9, 2010

(65) Prior Publication Data

US 2011/0225245 A1 Sep. 15, 2011

(51) Int. Cl.
*G06F 15/16* (2006.01)
*G06Q 10/10* (2012.01)

(52) U.S. Cl.
CPC .................................... *G06Q 10/107* (2013.01)
USPC .......................................................... 709/206

(58) Field of Classification Search
USPC .......................................................... 709/206
See application file for complete search history.

(56) References Cited

U.S. PATENT DOCUMENTS 5,790,074 A * 8/1998 Rangedahl et al. ...... 342/357.31
7,130,887 B2 10/2006 Goldberg
7,293,171 B2 11/2007 Batthish et al.
7,360,165 B2 * 4/2008 Cortright et al. .............. 715/752
7,702,107 B1 * 4/2010 Messing ....................... 380/259
7,865,554 B2 * 1/2011 Brubacher et al. ............ 709/206
8,627,084 B1 * 1/2014 Pauker et al. ................ 713/171
2004/0243678 A1 * 12/2004 Smith ........................... 709/206
2005/0063544 A1 * 3/2005 Uusitalo et al. ............... 380/277
2005/0160292 A1 * 7/2005 Batthish et al. ............... 713/201
2005/0188043 A1 * 8/2005 Cortright et al. .............. 709/206
2007/0005706 A1 * 1/2007 Branda et al. ................. 709/206
2007/0094339 A1 4/2007 Bauchot et al.
2007/0112927 A1 5/2007 Jung
2007/0124392 A1 * 5/2007 Goldberg ...................... 709/206
2007/0198639 A1 8/2007 Litwin et al.
2008/0005355 A1 1/2008 Craft et al.
2008/0021966 A1 1/2008 Asami
2009/0217028 A1 * 8/2009 Khan et al. .................... 713/150
2010/0198931 A1 * 8/2010 Pocklington et al. ......... 709/206
2010/0281254 A1 * 11/2010 Carro et al. ................... 713/162
2011/0035681 A1 * 2/2011 Mandel et al. ................ 715/752
2011/0225254 A1 * 9/2011 Atkins et al. .................. 709/206

OTHER PUBLICATIONS

IBM Technical Disclosure "Method of Setting the "cc" and "bcc" Attributes as a Part of a Mail Alias," Publication date Mar. 23, 2005, retrieved from www.ip.com, 2 pages.
IBM Technical Disclosure "Selective Hidden Note Areas, for any blind carbon copy (bcc:) Recipients and Nested Blind Carbon Copy," Original Publication date Dec. 6, 2001, Electronic Publication date Jun. 20, 2003, retrieved from www.ip.com, 2 pages.

* cited by examiner

*Primary Examiner* — Brian P Whipple
*Assistant Examiner* — James Edwards
(74) *Attorney, Agent, or Firm* — Patterson & Sheridan, LLP

(57) ABSTRACT

Methods, apparatus and articles for sending emails to a plurality of recipients comprising a group of blind carbon copied recipients. A graphical user interface (GUI) screen comprising a TO field, a carbon copy field, and at least one blind carbon copy group (BCC-G) field may be provided for entering a list of recipients for the email. The email may be transferred to the recipients such that the identities of a plurality of recipients in the at least one BCC-G field are disclosed only to the recipients within the BCC-G field.

12 Claims, 8 Drawing Sheets

SENDING MESSAGES WITH LIMITED AWARENESS OF RECIPIENTS

BACKGROUND

1. Field of the Invention

The present invention generally relates to data processing, and more specifically to processing electronic mail.

2. Description of the Related Art

Electronic mail (e-mail) is a widespread form of communication between users of computerized devices. Typically, e-mails are composed and sent using an e-mail client application. The e-mail client generates a graphical user interface (GUI) that may allow a user to enter a message. The GUI may also include one or more fields, for example, a "TO" field, a "CC" (carbon copy) field, a "BCC" (blind carbon copy) field, or the like, for entering a list of recipients of the email.

SUMMARY

The present invention generally relates to data processing, and more specifically to processing electronic mail.

One embodiment of the invention provides a method for sending emails. The method generally comprises providing a graphical user interface (GUI) for entering identities of recipients of an email, the GUI comprising a TO field, a carbon copy (CC) field, and at least one blind carbon copy group (BCC-G) field. The method further comprises receiving identities of a plurality of recipients in the at least one BCC-G field, and transferring the email to identified recipients of the email, wherein the email is configured to disclose the identities of the plurality of recipients in the at least one BCC-G field only to the recipients within the BCC-G field.

Another embodiment of the invention provides a computer readable storage medium comprising a program product which, when executed, is configured to perform an operation for sending an email. The operation generally comprises providing a graphical user interface (GUI) for entering identities of recipients of an email, the GUI comprising a TO field, a carbon copy (CC) field and at least one blind carbon copy group (BCC-G) field. The operation further comprises receiving identities of a plurality of recipients in the at least one BCC-G field, and transferring the email to identified recipients of the email, wherein the email is configured to disclose the identities of the plurality of recipients in the at least one BCC-G field only to the recipients within the BCC-G field.

Yet another embodiment of the invention provides a system comprising at least one client computer configured to display a graphical user interface (GUI) for entering identities of recipients of an email. The GUI generally comprises a TO field, a carbon copy (CC) field, and at least one blind carbon copy group (BCC-G) field. The system also comprises an email server configured to receive identities of a plurality of recipients in the at least one BCC-G field, and transfer the email to identified recipients of the email, wherein the email is configured to disclose the identities of the plurality of recipients in the at least one BCC-G field only to the recipients within the BCC-G field.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
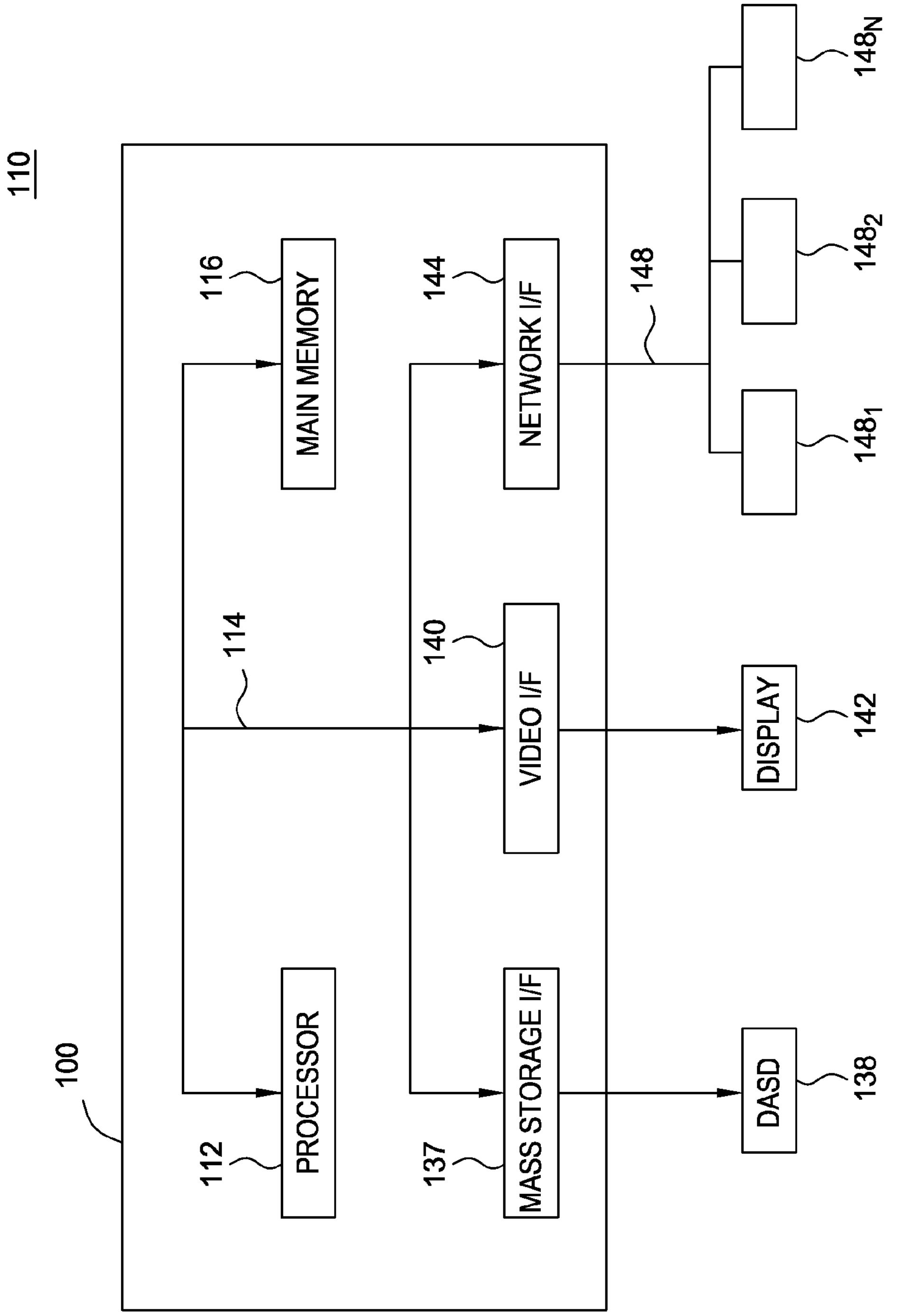
FIG. 1 illustrates an exemplary computer according to an embodiment of the invention.

Embodiments of the invention provide methods for sending emails to a plurality of recipients comprising a group of blind carbon copied recipients. A graphical user interface (GUI) screen comprising a TO field, a carbon copy field, and at least one blind carbon copy group (BCC-G) field may be provided for entering a list of recipients for the email. The email may be transferred to the recipients such that the identities of a plurality of recipients in the at least one BCC-G field are disclosed only to the recipients within the BCC-G field.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 shows a computer 100 (which is part of a computer system 110) that becomes a special-purpose computer according to an embodiment of the invention when configured with the features and functionality described herein. The computer system 100 may represent any type of computer, computer system or other programmable electronic device, including a client computer, a server computer, a portable computer, a personal digital assistant (PDA), a cell phone, an embedded controller, a PC-based server, a minicomputer, a midrange computer, a mainframe computer, and other computers adapted to support the methods, apparatus, and article of manufacture of the invention. The terms client computer and server computer are used herein merely for convenience in describing embodiments and in general may refer to any computer, including a computer containing both client-type software and server-type software.

Illustratively, the computer 100 is part of a networked system 110. In this regard, the invention may be practiced in a distributed computing environment in which tasks are performed by remote processing devices that are linked through a communications network. In a distributed computing environment, program modules may be located in both local and remote memory storage devices. In another embodiment, the computer 100 is a standalone device. For purposes of construing the claims, the term "computer" shall mean any computerized device having at least one processor. The computer may be a standalone device or part of a network in which case the computer may be coupled by communication means (e.g., a local area network or a wide area network) to another device (i.e., another computer).

In any case, it is understood that FIG. 1 is merely one configuration for a computer system. Embodiments of the invention can apply to any comparable configuration, regardless of whether the computer system 100 is a complicated multi-user apparatus, a single-user workstation, or a network appliance that does not have non-volatile storage of its own.

The computer 100 could include a number of operators and peripheral systems as shown, for example, by a mass storage interface 137 operably connected to a storage device 138, by a video interface 140 operably connected to a display 142, and by a network interface 144 operably connected to the plurality of networked devices 146 (which may be representative of the Internet). Although storage 138 is shown as a single unit, it could be any combination of fixed and/or removable storage devices, such as fixed disc drives, floppy disc drives, tape drives, removable memory cards, or optical storage. The display 142 may be any video output device for outputting viewable information.

Computer 100 is shown comprising at least one processor 112, which obtains instructions and data via a bus 114 from a main memory 116. The processor 112 could be any processor adapted to support the methods of the invention. In particular, the computer processor 112 is selected to support the features of the present invention.

The main memory 116 is any memory sufficiently large to hold the necessary programs and data structures. Main memory 116 could be one or a combination of memory devices, including Random Access Memory, nonvolatile or backup memory, (e.g., programmable or Flash memories, read-only memories, etc.). In addition, memory 116 may be considered to include memory physically located elsewhere in a computer system 110, for example, any storage capacity used as virtual memory or stored on a mass storage device (e.g., direct access storage device 138) or on another computer coupled to the computer 100 via bus 114. Thus, main memory 116 and storage device 138 could be part of one virtual address space spanning multiple primary and secondary storage devices.

Figure 2:
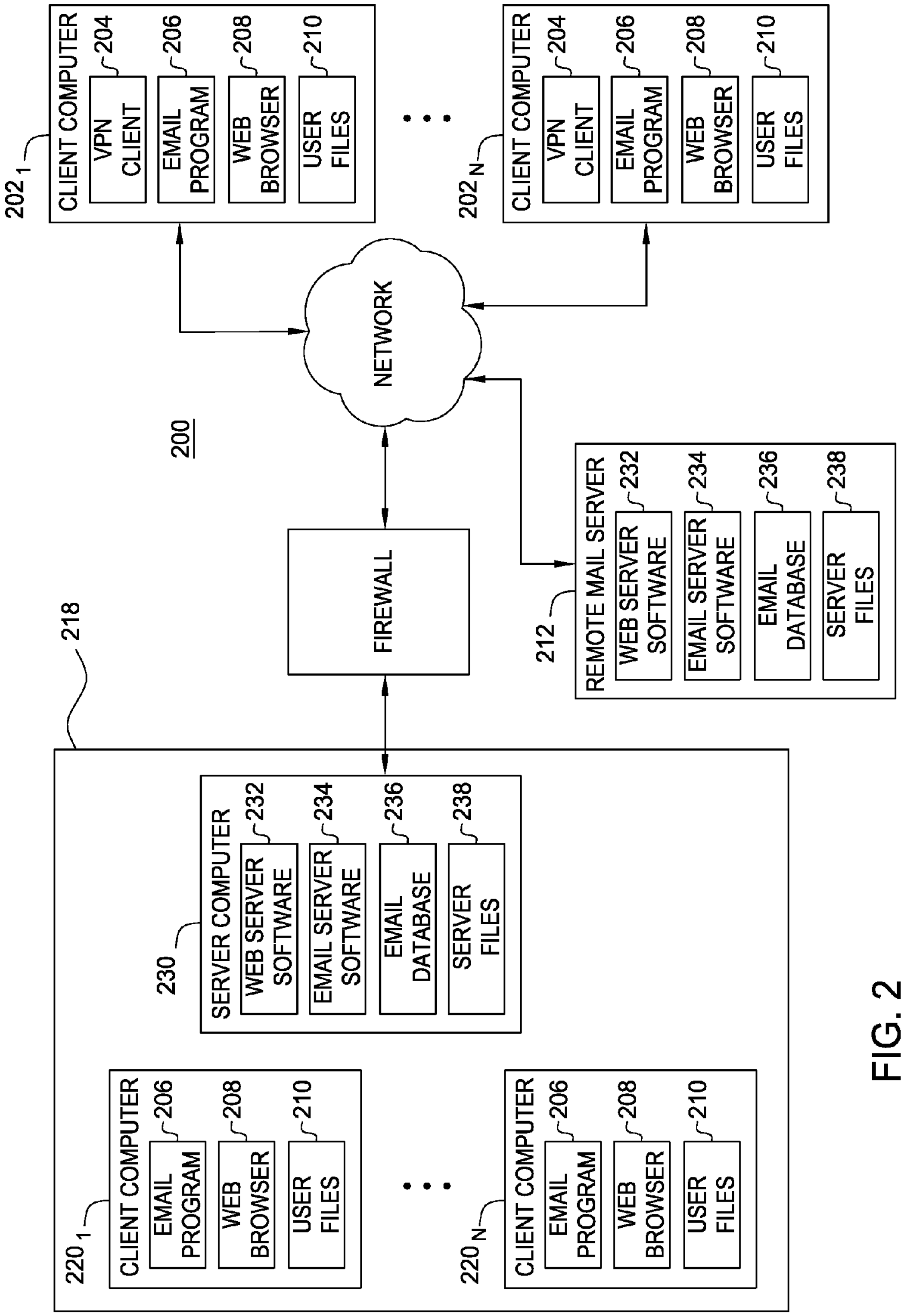
FIG. 2 illustrates an exemplary system for exchanging emails according to an embodiment of the invention.

FIG. 2 depicts an exemplary networked environment 200 in which e-mail messages may be transmitted according to embodiments of the present invention. The networked environment 200 may comprise an intranet 218, a network 216, a remote mail server 212, and a plurality of client computers 2021 . . . 202N which may be outside of the intranet 218. The intranet 218 may contain a plurality of client computers 2201 . . . 220N as well as a server computer 230. Each computer in the intranet 218 may be connected to the network 216 by a firewall 214. Intranet 218 may be any network, including, for example, a corporate/office/enterprise intranet, university intranet, or home/personal intranet. Network 216 may also be any network, including a large wide-area network (WAN) such as the Internet. Each client computer 2021 . . . 202N and 2201 . . . 220N may be a computer system (e.g. the computer system 110 depicted in FIG. 1). The client computers 2021 . . . 202N and 2201 . . . 220N may be connected to one another through the network 216 and intranet 218 and also connected through the intranet 218 and network 216 to the server computer 230 and remote mail server 212.

Each of the servers 212, 230 may provide a variety of e-mail services to each of the client computers 2021 . . . 202N and 2201 . . . 220N. These e-mail services may be provided on a variety of different scales. For instance, the provided e-mail services may include large Internet services such as Yahoo! Mail™ or Hotmail™. The e-mail services may also include mid-size and smaller e-mail services, such as enterprise level, corporate or business e-mail services, university e-mail services, and home or personally run e-mail services.

In some cases, the servers 212, 230 may provide e-mail services in one or more protocols. The provided e-mail protocols may include the Post Office Protocol (POP, including, for instance, versions POP2 or POP3), the Simple Mail Transfer Protocol (SMTP), and Internet Message Access Protocol (IMAP), as well as any other appropriate protocol.

According to one embodiment of the invention, each server 212, 230 may have e-mail server software 234 which implements each provided protocol and provides e-mail services to each of the clients. In one embodiment, each client computer 2021 . . . 202N and 2201 . . . 220N may access the e-mail services provided by the e-mail server software 234 using an e-mail program 206. When the e-mail server software 234 receives an access request (e.g., a request to check, read, or send e-mail) from the e-mail program 206, the e-mail server software 234 may access an e-mail database 236 and use information within the e-mail database 236 to process the request. The e-mail database 236 may include any information, including sent e-mail messages, sent e-mail attachments, drafted messages, received e-mail messages, received e-mail attachments, user information, and any other information used by the e-mail server software 234.

In some cases, each client computer 2021 . . . 202N and 2201 . . . 220N may also store e-mail information (e.g., in local user files 210) which may include e-mail messages, e-mail attachments and/or cached copies of e-mail information stored in a remote e-mail database 236.

Client computers 2021 . . . 202N and 2201 . . . 220N depicted in FIG. 2 may access the e-mail services provided by each of the server computers 212, 230 using a variety of access methods and configurations. Where client computers 2201 . . . 220N are located within intranet 218, the client computers 2201 . . . 220N may connect directly to the server computer 230 within the intranet 218 with an e-mail program 206 configured to access the server computer 230. The e-mail program 206 may use one or more of the protocols described above to access the e-mail server software 234.

Where client computers 2021 . . . 202N outside of an intranet 218 access computers 230, 2201 . . . 220N inside the intranet 218, the external client computers 2021 . . . 202N may use a virtual private network (VPN) to create a connection. The VPN may be accessed by the client computers 2021 . . . 202N using a VPN client 204. Thus, in some cases, the VPN client 204 may be used in conjunction with the e-mail program 206 to access the e-mail services provided by the e-mail server software 234 on the server computer 230. In other cases, where client computers 2021 . . . 202N and 2201 . . . 220N access a remote mail server 212 which is not within an intranet 218, the mail services provided by the server computer 212 may be accessed without the VPN client 204. In other embodiments, the VPN client may not be used to access either server computer 212, 230.

Each of the servers 212, 230 may also provide e-mail services using a web based e-mail service (also referred to as a webmail service, or Internet mail service). The web based e-mail service may be implemented using web server software 232 on each server computer 212, 230 which provides each client computer 2021 . . . 202N and 2201 . . . 220N a series of web pages. According to one embodiment of the invention, each client computer 2021 . . . 202N and 2201 . . . 220N may use web browser software 208 or the e-mail program 206 to access the web based e-mail service. Each client computer 2021 . . . 202N and 2201 . . . 220N may access the web based e-mail services provided by the server computers 212, 230 using a variety of protocols, including the Hypertext Transfer Protocol (HTTP), File Transfer Protocol (FTP), Gopher, Telnet, etc.

The web pages provided by the web server software 230 may be used to access e-mail services provided by the server computer 212, 230. Accordingly, the web pages may utilize one or more forms, such as Hypertext Markup Language (HTML) forms, and/or one or more scripts and/or applets to process requests from client computers 2021 . . . 202N and 2201 . . . 220N. The scripts used to access the e-mail services may include scripts executed by the server computers 212, 230. Scripts executed by the server computers 212, 230 (referred to as server-side scripts) may be executed, for example, by the web server software 232, e-mail server software 234, or other server software. The scripts used to access the e-mail services may also include scripts executed by the client computers 2021 . . . 202N and 2201 . . . 220N (referred to as client-side scripts) and may be executed, for example, by the e-mail program 206, web browser 208, or other client software.

Networked environment 200 is merely an exemplary networked environment and other configurations, variations, and components of the networked environment (such as routers, storage servers, file servers, etc. . . . , not depicted) should be readily apparent to one of ordinary skill in the art. For instance, in some embodiments, multiple separate computers may be used as web and e-mail servers, with one or more computers executing for the web server software 232 and one or more computers executing e-mail server software 234. In some cases, each e-mail service may provide several e-mail domains wherein a separate e-mail server provides e-mail service to each domain and wherein an e-mail router is used to route all e-mail received by the e-mail service to the appropriate e-mail server. In general, embodiments of the invention may be adapted for use in any situation in which electronic messages are transmitted.

Embodiments of the invention are not limited to the client-server model described hereinabove. Advantages of the invention may also be realized in alternative arrangements and networks of computer systems such as, for example, peer-to-peer (P2P) networks. Furthermore, embodiments of the invention are described herein with reference to e-mail messages for illustrative purposes only. In alternative embodiments, advantages of the invention may be realized with respect to any type of electronic message including, for example, text messages, instant messages, or the like.

Emails generally include a plurality of fields for including email addresses of intended recipients. The fields may include a TO field, a carbon copy (CC) field, a blind carbon copy (BCC) field, etc. The identity of recipients listed in the TO and CC fields may be disclosed to each recipient of an email. The BCC field may be used when the sender does not want recipients of the email to know each others' identity. In some cases, however, a user may want to send an email to a group of recipients, wherein the identity of recipients within the group are known to the group members but not to other recipients of the email that are not in the group. Embodiments of the invention provide a BCC group field that may be used to send emails to a group of recipients, wherein the identity of the recipients within the group are disclosed to group members but not to recipients that are not a part of the group.

Figure 3:
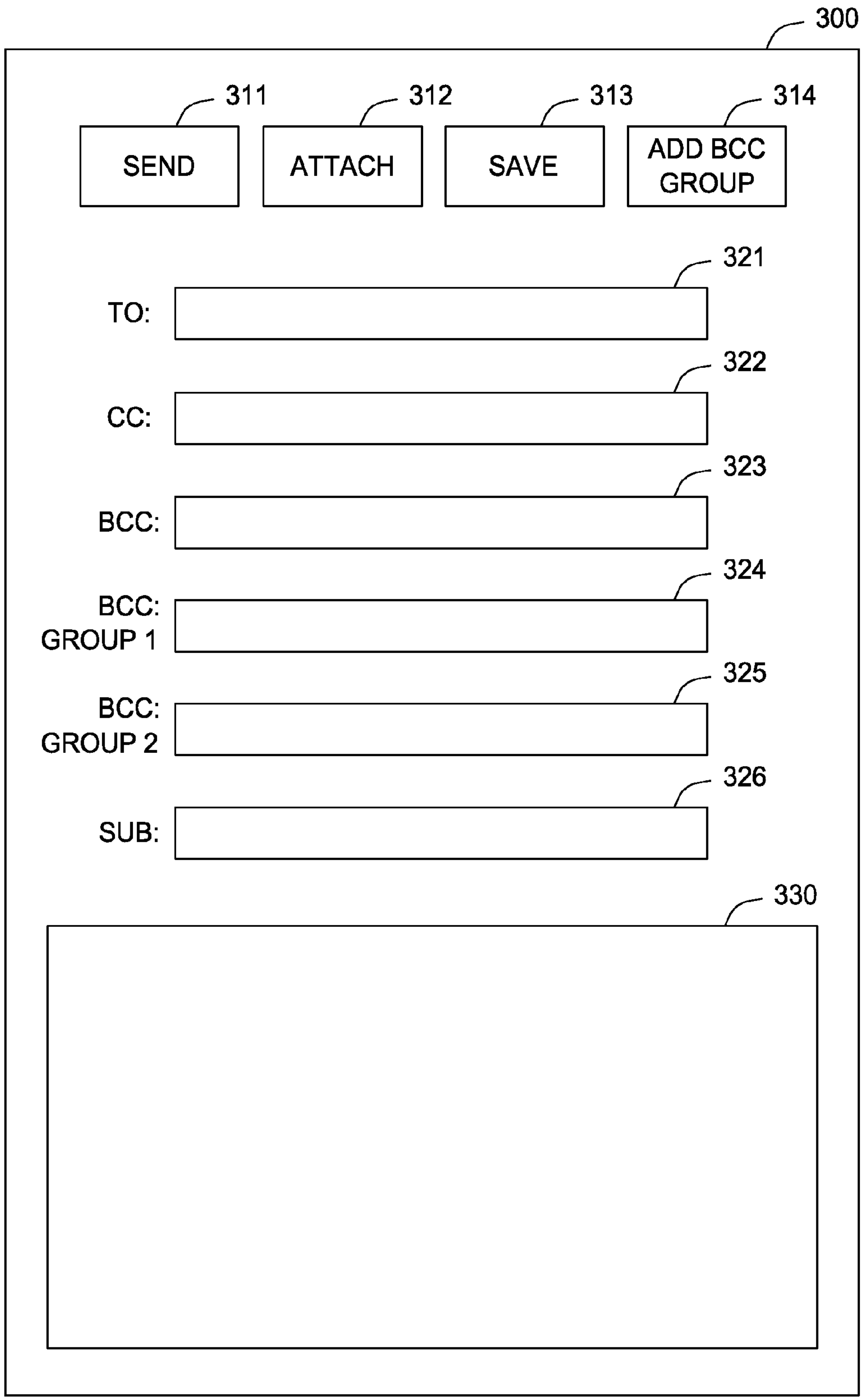
FIG. 3 illustrates an exemplary graphical user interface for composing an email, according to an embodiment of the invention.

FIG. 3 illustrates an exemplary graphical user interface (GUI) 300 that may be used to compose an email, according to an embodiment of the invention. The GUI 300 may be generated by any one of the email program 206, web browser 208, web server software 232, and email server software 234. As illustrated in FIG. 3, the GUI 300 may include a plurality of buttons including, for example, a send button 311, an attach button 312, a save button 313, and a add BCC group button 314. Clicking the send button 311 may cause an email to be sent to one or more recipients listed in fields 321-325 (described below). The attach button 312, when clicked, may allow a user to attach files to the email. For example, a user may attach one or more images, videos, documents, spreadsheets, and the like to the email.

Save button 313 may be used to save an email that has at least partially been composed. For example, clicking the save button 313 may cause the email to be archived so that a user may later retrieve the email to further edit and/or send the email to one or more recipients. The add BCC group button 314 may be used to add a BCC group field, e.g., the BCC group fields 324 and 325 to the GUI 300. In some embodiments, a hide BCC group button (not shown) may also be provided to reduce the number of BCC group fields, e.g., the BCC group fields 324 and 325, which are shown in the GUI 300.

While the send, attach, save, and add BCC group functions are invoked using buttons 311-314, in alternative embodiments, any reasonable graphical tool may be used to invoke the respective functions. For example, in some embodiments, drop down menus, radio buttons, checkboxes, and the like may be used to invoke the above referenced functions. Furthermore, in alternative embodiments, any number of additional functions may be added to the GUI 300. For example, some embodiments may include graphical tools that facilitate printing, text editing, hyperlinking, maintaining an email address book, and the like.

FIG. 3 also illustrates a plurality of fields for entering email addresses of one or more recipients. For example, a TO field 321, a carbon copy (CC) field 322, a blind carbon copy (BCC) field 323, and BCC Group fields 324 and 325 are illustrated. When an email is sent, the information regarding other recipients of the email that is displayed to a particular recipient may depend on the type of recipient field (e.g., TO, CC, BCC, BCC Group) in which the particular recipient is listed.

In general, each recipient in the TO field 321 may receive an email that lists the names and/or email addresses of other recipients in the TO field 321 and the recipients in the CC field 322. Each recipient in the CC field 322 may also receive an email that lists the names and/or email addresses of recipients in the TO field 321 and the other recipients in the CC field 322. However, the email sent to recipients in the To field 321 and CC field 322 may not show the names or email addresses of recipients listed in the BCC field 323 or the BCC group fields, e.g., the BCC group fields 324 and 325.

In one embodiment, each recipient in the BCC field 323 may receive an email that lists the names and/or email addresses of recipients in the TO field 321 and the recipients in the CC field 322. However, the email received by a recipient in the BCC field 323 may not indicate names and/or email addresses of other recipients in the BCC field 323.

In one embodiment, each recipient in a BCC group field may receive an email that lists the names and/or email addresses of recipients in the To field 321, the recipients in the CC field 322, and other recipients listed in the same BCC group field. For example, each recipient in a BCC group field 324 may receive an email that lists the names and/or email addresses of recipients in the To field 321, the recipients in the CC field 322, and other recipients listed in the BCC group field 324. However, the email received by recipients listed in the BCC group field 324 may not include names and addresses of recipients in the BCC group field 325.

Similarly, each recipient in a BCC group field 325 may receive an email that lists the names and/or email addresses of recipients in the To field 321, the recipients in the CC field 322, and other recipients listed in the BCC group field 325. However, the email received by recipients listed in the BCC group field 325 may not include names and addresses of recipients in the BCC group field 324.

FIG. 3 also illustrates a subject field 326 and a message field 330. The subject field may be a text area for entering a subject line for an email. The message field 330 may also be a text area for entering text that forms a message included in the email.

In one embodiment of the invention, an email generated using GUI 300 may include two components, an email header and an email body. The body of the email may contain a message, e.g., the message included in the message field 330. The email header may include control information for the email, e.g., the sender's email address and email addresses of one or more recipients. In one embodiment, an email header may include a plurality of fields. For example, the email header may include a From field which may include the sender's email address. The header may also include a TO field, a CC field, a BCC field, and the like, which may include information entered in the TO field 321, CC field 322, and BCC field 323 of GUI 300.

In one embodiment of the invention, the email header may also include one or more BCC group fields which may include information related to one or more BCC groups entered using, for example, the BCC group fields 324 and 325. Embodiments of the invention are not limited to emails including only the header fields described herein. In alternative embodiments, the email header may include any other number and types of fields including, for example, date fields describing a date and/or time associated with the email, a subject field describing a subject of the email, a reply-to field describing an email address for replying to the email, a priority field describing an importance level of the email, and the like.

Figure 4A:
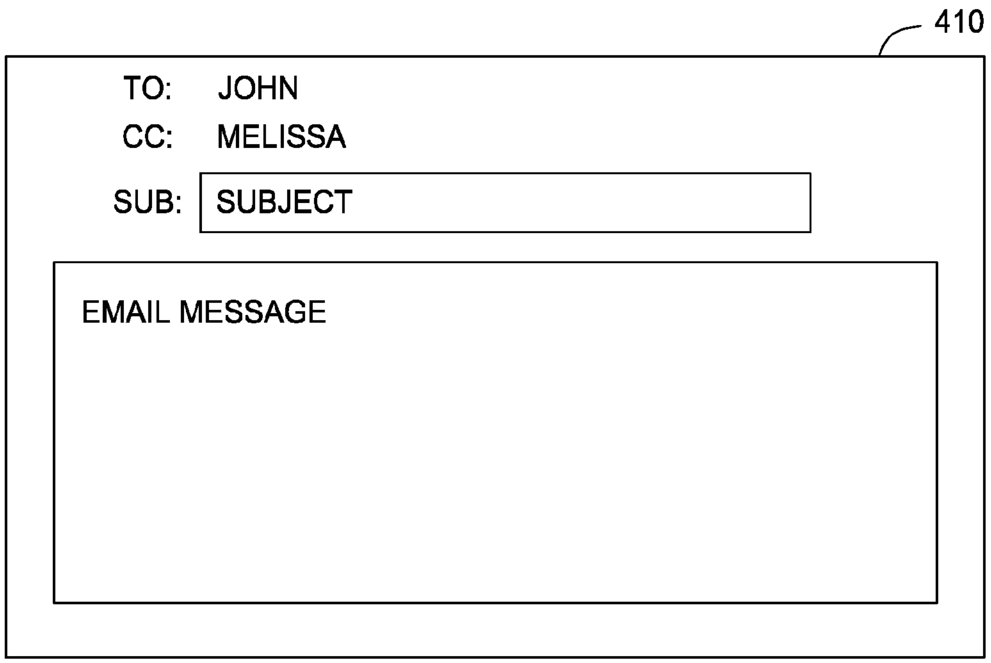
FIGS. 4A-C illustrate exemplary emails received by recipients of an email, according to an embodiment of the invention.
Figure 4B:
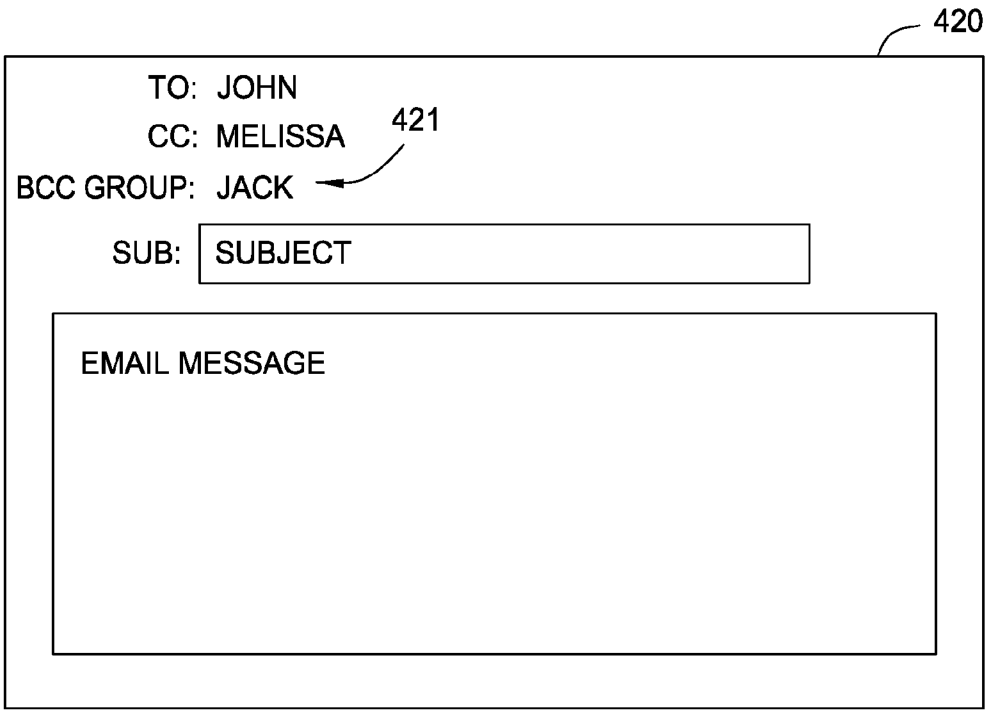
Figure 4C:
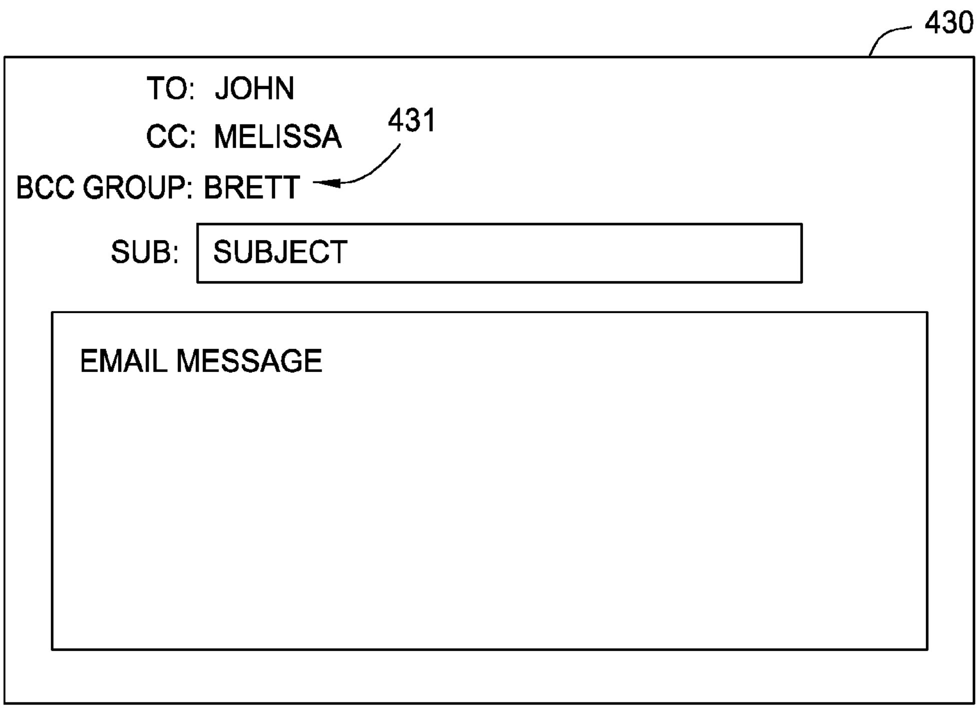

FIGS. 4A-C illustrate examples of emails received by recipients of an email composed using the GUI 300 of FIG. 3. For the purposes of this illustration, it is assumed that an email is composed and sent to the following recipients listed in the following fields listed below. For the purposes of simplicity, the recipients' first name is shown instead of email addresses. However, one skilled in the art will realize that the fields 321-325 may be populated with email addresses in the form of, for example, name@domain.com, wherein the 'name' portion of the email address is a character string that is unique to a particular user and the 'domain' is an identification of an email service provider for that user.

TO: John
CC: Melissa
BCC: Tim; Lauren
BCC G1: Janet; Jack
BCC G2: Patrick; Brett FIG. 4A illustrates an email 410 that may be received by John and Melissa listed in the TO and CC fields, respectively. As illustrated in FIG. 4A, the email 410 only shows the names of John and Melissa, as recipients of the email. However, the names of recipients (e.g., Tim, Lauren, Janet, Jack, Patrick, and Brett) in the BCC, BCC G1, and BCC G2 fields are not shown. In one embodiment, the email 410 may also represent the email received by Tim and Lauren, listed in the BCC field. In other words, recipients in the BCC field may receive an email that shows recipients listed in the TO and CC fields, but not other recipients listed in the BCC field, or the BCC group fields BCC G1 and BCC G2.

FIG. 4B illustrates an email 420 that may be received by Janet, listed in the BCC G1 field. As illustrated in FIG. 4B, the email 420 shows the names of John and Melissa in the TO and CC fields. The email 420 also includes the name of Jack, as part of a BCC group 421 to which Janet also belongs. However, the email 420 does not include the names of Tim, Lauren, Patrick, and Brett, who are listed in the BCC and BCC G2 fields. In one embodiment, the email sent to Jack will be similar to the email 420, except with the name of Jack replaced with the name of Janet.

FIG. 4C illustrates an email 430 that may be received by Patrick, listed in the BCC G2 field. As illustrated in FIG. 4C, the email 430 shows the names of John and Melissa in the TO and CC fields. The email 430 also includes the name of Brett, as part of a BCC group 431 to which Patrick also belongs. However, the email 430 does not include the names of Tim, Lauren, Jack, and Janet, who are listed in the BCC and BCC G1 fields. In one embodiment, the email sent to Brett will be similar to the email 430, except with the name of Brett replaced with the name of Patrick.

In one embodiment of the invention, the GUI 300 illustrated in FIG. 3 may be generated by an email program 206 (See FIG. 2). When a user composes an email using the GUI 300 and clicks the send button, the email program 206 may transfer the email to a server computer, e.g., the server computer 230 or remote email server 212 illustrated in FIG. 2 (hereinafter referred to as mail servers). The mail server (i.e., the sender's mail server) may then transfer at least one email to at mail servers associated with the recipients listed in the email recipient fields, e.g., the recipient fields 321-325 in FIG. 3. The mail servers associated with the recipients may then display the email in a GUI at a respective client computer of the recipient.

In one embodiment, mail servers exchanging emails may be configured to operate based on a known protocol for disclosing email addresses or names of recipients of an email. For example, all mail servers receiving an email specifying a BCC group field may be configured to display, for each recipient listed in the BCC group field, the names and/or email addresses of recipients in the To field, the CC field, and other recipients listed in the same BCC group field. However, the mail servers may not disclose the list of recipients listed in a BCC field or a different BCC group field. In one embodiment of the invention, the mail servers may be configured to identify a BCC group field in the email header, and a list of recipients identified therein. Accordingly, the mail servers may display only the names/email addresses of recipients within a BCC group only to members of the BCC group (in addition to the names/email addresses of recipients listed in TO and CC fields of the email header).

In the foregoing embodiment where all mail servers communicate under an established common protocol, a sender's mail server may simply transfer copies of an email composed by a user to one or more mail servers associated with the recipients listed in the email. The email may include a header including a list of all recipients of the email. The one or more receiving mail servers may receive the email and display the email to their respective clients based on the established protocol for disclosing the email addresses of other recipients.

Figure 5:
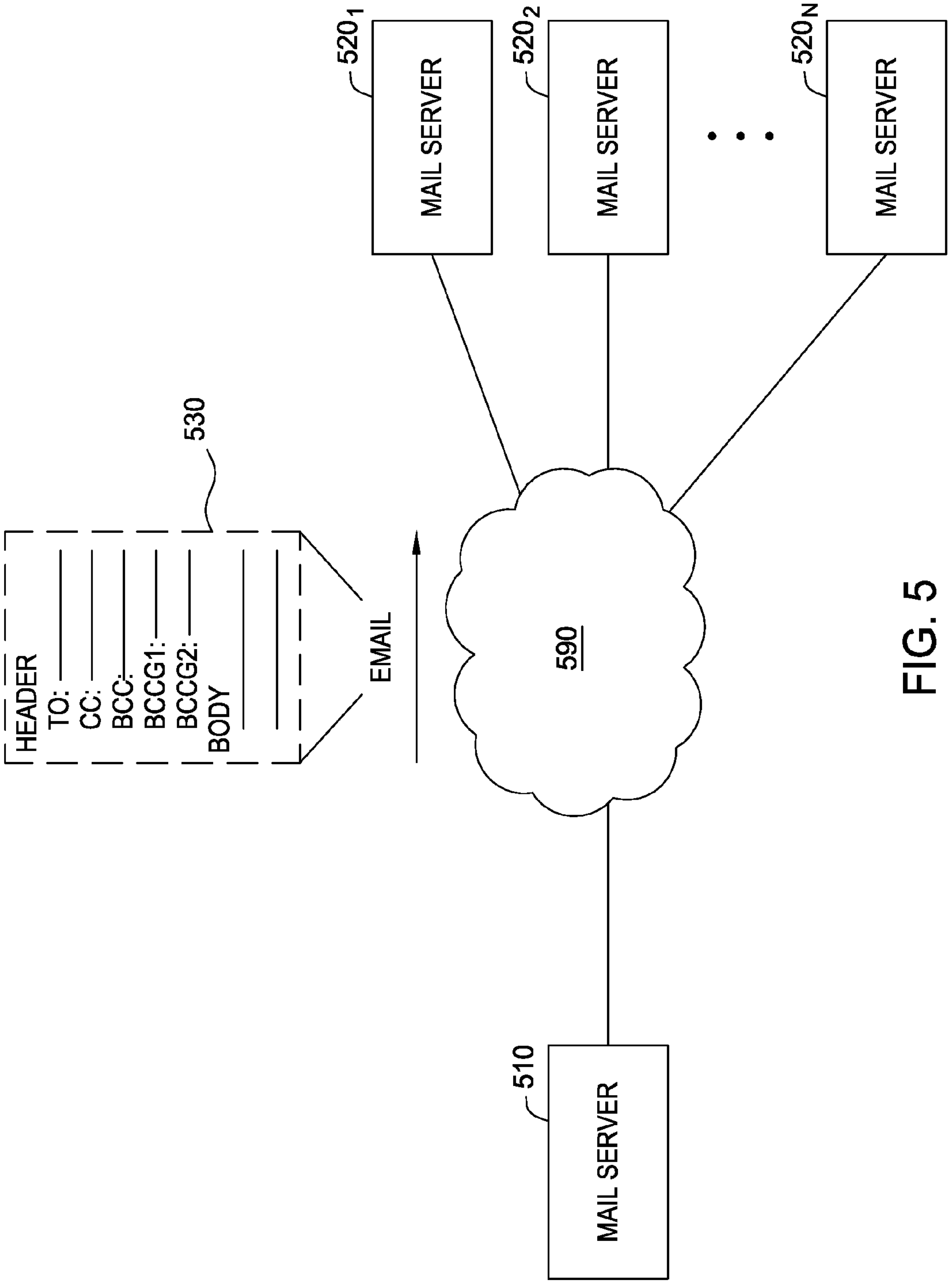
FIG. 5 illustrates transferring of an email according to an embodiment of the invention.

FIG. 5 illustrates an example of an email 530 that is sent from a mail server 510 to a plurality of mail servers $\mathbf{520}_{1\text{-}N}$ via a network 590. As illustrated in FIG. 5, the email 530 may include a header defining one or more fields, e.g., TO, CC, BCC, BCC G1, BCC G2, and an email body. In one embodiment, copies of the same email 530 may be transferred to each of the mail servers $\mathbf{520}_{1\text{-}N}$. Each of the mail servers $\mathbf{520}_{1\text{-}N}$ may be configured to identify the BCC group fields (BCC G1 and BCC G2) in the email header and disclose recipients listed in the BCC groups only to members of the respective group.

In one embodiment of the invention, the email software in the mail servers may be configured to encrypt data describing the BCC group recipients in an email header. For example, email server software in mail server 510 may be configured to encrypt at least the fields BCC G1 and BCC G2 in the header of email 530. Accordingly, only those receiving mail servers 520 which are set up to decrypt the data may be able to access the recipient list in the BCC G1 and BCC G2 fields of the email 530.

Figure 6:
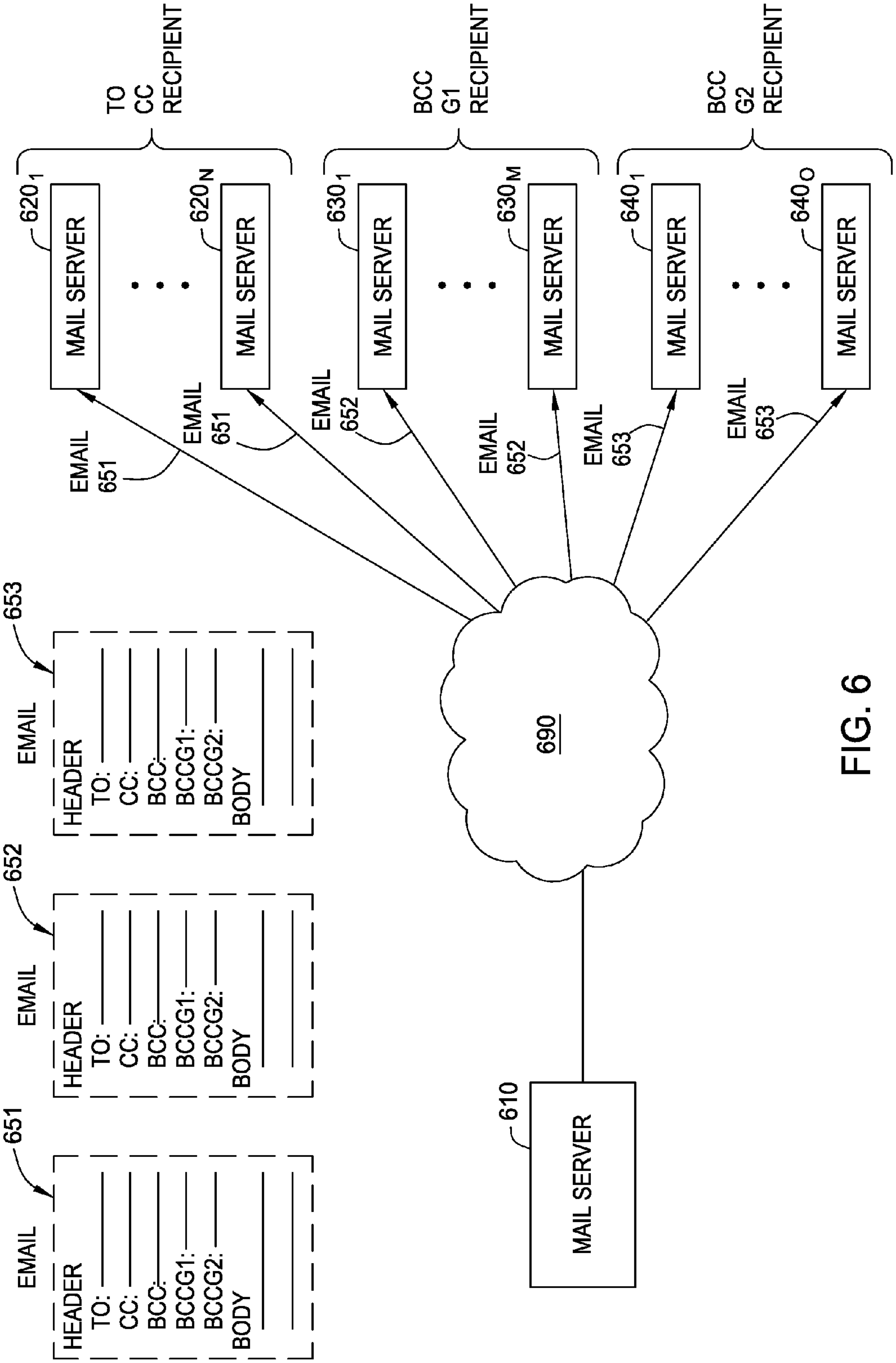
FIG. 6 illustrates transferring of a plurality of emails according to an embodiment of the invention.

In another embodiment, the mail servers may not operate under a common protocol. In such embodiments, email software in a sender's mail server may be configured to send two or more different emails to the recipients based on the particular email recipient fields that the recipients belong to. Each of the different emails may include the same body, subject line, attachments, and the like. However, the different emails may include different headers. FIG. 6 illustrates examples of a plurality of emails sent from a mail server 610 to a plurality of mail servers $\mathbf{620}_{1\text{-}N}$, $\mathbf{630}_{1\text{-}M}$, and $\mathbf{640}_{1\text{-}O}$ via a network 690. For example, in one embodiment a first email 651 may be sent from the mail server 610 to mail servers $\mathbf{620}_{1\text{-}N}$ associated with recipients listed in the TO and CC fields of the email. As illustrated in FIG. 6, in one embodiment, the email 651 may include a header comprising TO and CC fields. However, email server software at the mail server 610 may omit the BCC group fields in the email header of email 651.

In one embodiment, the mail servers $\mathbf{620}_{1\text{-}N}$ may receive the email 651 and process the email in a conventional manner. Because the email 651 does not include data related to the BCC group fields, the mail servers $\mathbf{620}_{1\text{-}N}$ may not disclose the names of recipients listed in the BCC group fields to the recipients in the TO and CC fields.

As further illustrated in FIG. 6, a second email 652 may be sent to mail servers $\mathbf{630}_{1\text{-}M}$ associated with recipients in a first BCC group BCC G1. As illustrated in FIG. 6, the email 652 may include a header having TO and CC fields, but may not include BCC group fields. In one embodiment, recipient names entered in a BCC group field of a GUI (e.g. GUI 300) may be displayed in a list in a body of the email. In a particular embodiment, a user may be required to verify his/her identity, e.g., by means of a predefined password, before the list of recipients is displayed in the body of the email. If the user cannot be verified as the intended recipient of the email, the list may be omitted or otherwise made inaccessible to the user.

The mail servers $\mathbf{630}_{1\text{-}M}$ may receive the email 652 and process the email using conventional methods and display the email to a viewer at a client computer.

In one embodiment, the email 652 displayed by the mail servers $\mathbf{630}_{1\text{-}M}$ may disclose recipients listed in the TO and CC fields. The CC field recipients may include recipients originally listed as CC recipients as well as recipients in a BCC group including the recipient of the email 652. However, because the recipients of BCC G2 (see email 653) are not listed in the CC field of email 652, the recipient of email 652 may have no knowledge of recipients in BCC G2.

In one embodiment of the invention, the email software at the mail server 610 may be configured to identify, within the email 652, the recipients that are a part of a BCC group. For example, in one embodiment, the email software may include a note in the body of the email identifying the recipients that were a part of the BCC group. While including a note in the email body is described herein, any reasonable means for identifying the BCC group recipients may be used in alternative embodiments. For example, in a particular embodiment, the BCC group recipients may be identified using a text effect, e.g., italics, bold face, underlining, or the like, within the CC list of recipients.

FIG. 6 also illustrates another email 653 that may be sent to mail servers $\mathbf{630}_{1\text{-}O}$ associated with recipients in a first BCC group BCC G2. As illustrated in FIG. 6, the email 653 may include a header having TO and CC fields, but may not include BCC group fields. In one embodiment, recipient names entered in a BCC G2 field of a GUI (e.g. GUI 300) may be included in the CC field of the header of email 653. Because the recipients of BCC G1 are not listed in the CC field of email 653, the TO or CC recipient of email 653 may have no knowledge of recipients in BCC G1.

In one embodiment, the mail server 610 may be configured to send one or more further emails in addition to the emails 651, 652, and 653 described hereinabove. For example, one or more separate emails may be sent to recipients listed as BCC group recipients.

Figure 7:
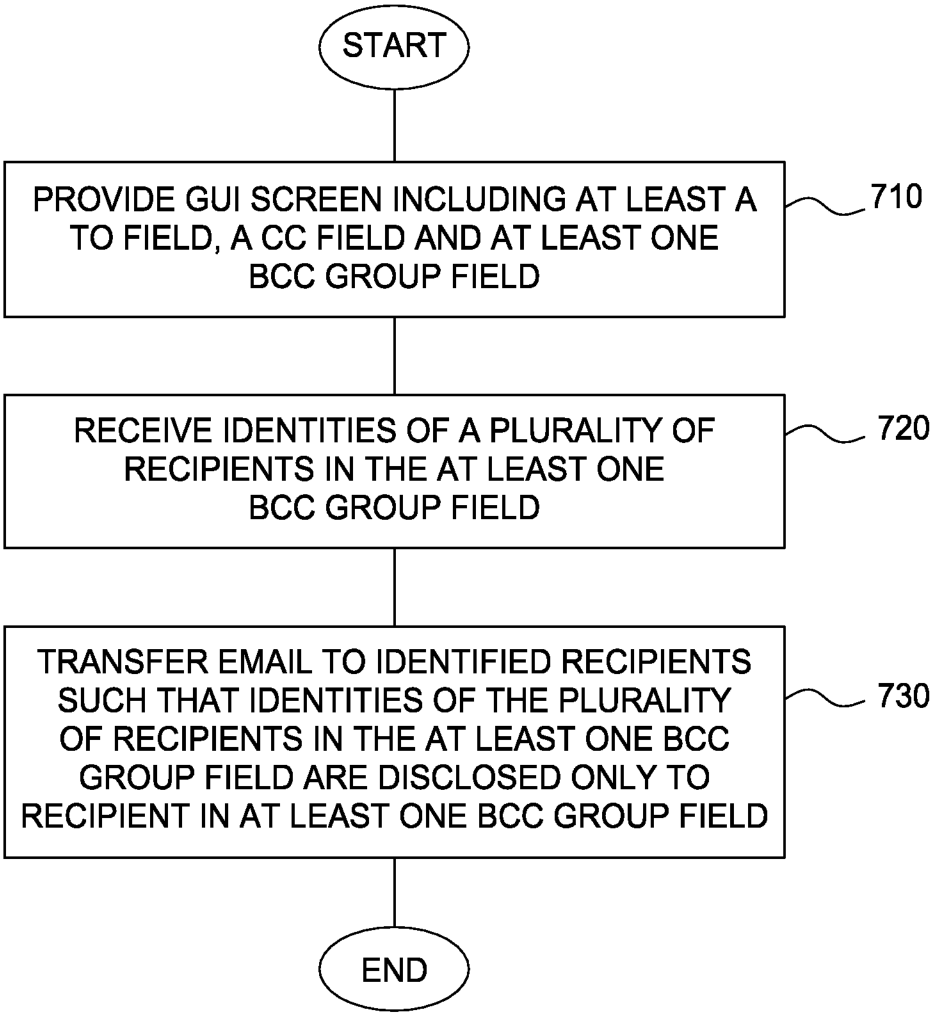
FIG. 7 is a flow diagram of exemplary operations performed by an email server software, according to an embodiment of the invention.

FIG. 7 is a flow diagram of exemplary operations that may be performed by an email server software for sending an email, according to an embodiment of the invention. The operations may begin in step 710 by providing a graphical user interface for composing a GUI, e.g., the GUI 300. For example, in one embodiment, an email server software 234 may cause an email program 206 to display a GUI for composing an email at a client computer 220 (see FIG. 2). In one embodiment, the GUI may include at least a TO field, a CC field, and at least one BCC group field.

In step 720, the email server software may receive identities of a plurality of recipients in the at least one BCC group field. In step 730, the email server software may transfer the email to identified recipients of the email, wherein the email is configured to disclose the identities of the plurality of recipients in the at least one BCC group field only to the recipients within the same BCC group field.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method for sending emails, comprising:

providing a graphical user interface (GUI) for entering identities of recipients of an email, the GUI comprising:
- a TO field; and
- a carbon copy (CC) field; and receiving at least one identity of a TO recipient in the TO field;

receiving at least one identity of a CC recipient in the CC field;

receiving identities of a plurality of blind carbon copy group (BCC-G) recipients in the CC field, wherein the identities of the plurality of BCC-G recipients are visually distinguished from the at least one identity of the CC recipient by a text effect; and responsive to an input received through the GUI for causing transmission of the email:
- sending a first instance of the email to the identified TO and CC recipients of the email, wherein the first instance of the email is configured to disclose the identities of the at least one identity of the CC recipient in the CC field to all recipients identified in the CC field, wherein the first instance of the email is configured to not disclose the identities of the plurality of BCC-G recipients identified in the CC field; and
- sending a second instance of the email to each of the plurality of BCC-G recipients identified in the CC field, wherein the second instance of the email discloses: (i) the identities of the plurality of BCC-G recipients identified in the CC field, (ii) the at least one identity of the TO recipient, and (iii) the at least one identity of the CC recipient to each of the plurality of BCC-G recipients identified in the CC field, wherein the first and second instances of the email contain the same subject line, body, and attachments, wherein the input received through the GUI causes separate transmission of the first and second instances of the email based on a single email composition comprising the TO, CC, and BCC-G recipients received through the GUI, wherein the first and second instances of the email include different headers reflecting the recipients of each respective instance of the email.

2. The method of claim 1, wherein the first instance of the email does not include the identities of the plurality of BCC-G recipients identified in the CC field, wherein the identities of the BCC-G recipients are encrypted in the second email, wherein a plurality of mail servers receiving the first and second emails do not operate under a common protocol, wherein the text effect is at least one of: underlining, bold face and italics.

3. The method of claim 2, further comprising:

receiving identities of at least one additional BCC-G recipient in the CC field, wherein the at least one additional BCC-G recipient is identified using text effect visually distinguishable from the text effect used to identify the plurality of the BCC-G recipients; and sending a third instance of the email to each of the plurality of BCC-G recipients identified in the CC field, wherein the third instance of the email discloses: (i) the identities of the plurality of BCC-G recipients identified in the CC field, (ii) the at least one identity of the TO recipient, and (iii) the at least one identity of the CC recipient to each of the plurality of BCC-G recipients identified in the CC field, wherein the third instance of the email does not disclose the identities of the plurality of BCC-G recipients identified in the CC field, wherein the first, second, and third instances of the email contain the same subject line, body, and attachments.

4. The method of claim 3, further comprising:

requiring receipt of a predefined password as a condition to disclose the identities of the plurality of the BCC-G recipients to a respective one of the identified BCC-G recipients providing the predefined password.

5. A non-transitory computer readable storage medium having computer-readable program code embodied therewith, the computer-readable program code comprising:

computer-readable program code configured to provide a graphical user interface (GUI) for entering identities of recipients of an email, the GUI comprising:

a TO field; and a carbon copy (CC) field;

computer-readable program code configured to receive at least one identity of a TO recipient in the TO field;

computer-readable program code configured to receive at least one identity of a CC recipient in the CC field;

computer-readable program code configured to receive identities of a plurality of blind carbon copy group (BCC-G) recipients in the CC field, wherein the identities of the plurality of BCC-G recipients are visually distinguished from the at least one identity of the CC recipient by a text effect; and computer-readable program code configured to, responsive to an input received through the GUI for causing transmission of the email:

send a first instance of the email to the identified TO and CC recipients of the email, wherein the first instance of the email is configured to disclose the identities of the at least one identity of the CC recipient in the CC field to all recipients identified in the CC field, wherein the first instance of the email is configured to not disclose the identities of the plurality of BCC-G recipients identified in the CC field; and send a second instance of the email to each of the plurality of BCC-G recipients identified in the CC field, wherein the second instance of the email discloses: (i) the identities of the plurality of BCC-G recipients identified in the CC field, (ii) the at least one identity of the TO recipient, and (iii) the at least one identity of the CC recipient to each of the plurality of BCC-G recipients identified in the CC field, wherein the first and second instances of the email contain the same subject line, body, and attachments, wherein the input received through the GUI causes separate transmission of the first and second instances of the email based on a single email composition comprising the TO, CC, and BCC-G recipients received through the GUI, wherein the first and second instances of the email include different headers reflecting the recipients of each respective instance of the email.

6. The computer readable storage medium of claim 5, wherein the first instance of the email does not include the identities of the plurality of BCC-G recipients identified in the CC field, wherein the identities of the BCC-G recipients are encrypted in the second email, wherein a plurality of mail servers receiving the first and second emails do not operate under a common protocol, wherein the text effect is at least one of: underlining, bold face and italics.

7. The computer readable storage medium of claim 6, the computer-readable program code further comprising:

computer-readable program code configured to receive identities of at least one additional BCC-G recipient in the CC field, wherein the at least one additional BCC-G recipient is identified using text effect visually distinguishable from the text effect used to identify the plurality of the BCC-G recipients; and computer-readable program code configured to send a third instance of the email to each of the plurality of BCC-G recipients identified in the CC field, wherein the third email discloses: (i) the identities of the plurality of BCC-G recipients identified in the CC field, (ii) the at least one identity of the TO recipient, and (iii) the at least one identity of the CC recipient to each of the plurality of BCC-G recipients identified in the CC field, wherein the third instance of the email does not disclose the identities of the plurality of BCC-G recipients identified in the CC field, wherein the first, second, and third instances of the email contain the same subject line, body, and attachments.

8. The computer readable storage medium of claim 7, the computer-readable program code further comprising:

computer-readable program code configured to require receipt of a predefined password as a condition to disclose the identities of the plurality of the BCC-G recipients to a respective one of the identified BCC-G recipients providing the predefined password.

9. A system, comprising:

at least one client computer configured to display a graphical user interface (GUI) for entering identities of recipients of an email, the GUI comprising:

a TO field; and a carbon copy (CC) field; and an email server configured to:

receive at least one identity of a CC recipient in the CC field;

receive identities of a plurality of blind carbon copy group (BCC-G) recipients in the CC field, wherein the identities of the plurality of BCC-G recipients are visually distinguished from the at least one identity of the CC recipient by a text effect; and responsive to an input received through the GUI for causing transmission of the email:

send a first instance of the email to the identified TO and CC recipients of the email, wherein the first instance of the email is configured to disclose the identities of the at least one identity of the CC recipient in the CC field to all recipients identified in the CC field, wherein the first instance of the email is configured to not disclose the identities of the plurality of BCC-G recipients identified in the CC field; and send a second instance of the email to each of the plurality of BCC-G recipients identified in the CC field, wherein the second instance of the email discloses: (i) the identities of the plurality of BCC-G recipients identified in the CC field, (ii) the at least one identity of the TO recipient, and (iii) the at least one identity of the CC recipient to each of the plurality of BCC-G recipients identified in the CC field, wherein the first and second instances of the email contain the same subject line, body, and attachments, wherein the input received through the GUI causes separate transmission of the first and second instances of the email based on a single email composition comprising the TO, CC, and BCC-G recipients received through the GUI, wherein the first and second instances of the email include different headers reflecting the recipients of each respective instance of the email.

10. The system of claim 9, wherein the first instance of the email does not include the identities of the plurality of BCC-G recipients identified in the CC field, wherein the identities of the BCC-G recipients are encrypted in the second email, wherein a plurality of mail servers receiving the first and second emails do not operate under a common protocol, wherein the text effect is at least one of: underlining, bold face and italics.

11. The system of claim 10, wherein the mail server is further configured to:

receive identities of at least one additional BCC-G recipient in the CC field, wherein the at least one additional BCC-G recipient is identified using text effect visually distinguishable from the text effect used to identify the plurality of the BCC-G recipients; and send a third instance of the email to each of the plurality of BCC-G recipients identified in the CC field, wherein the third email discloses: (i) the identities of the plurality of BCC-G recipients identified in the CC field, (ii) the at least one identity of the TO recipient, and (iii) the at least one identity of the CC recipient to each of the plurality of BCC-G recipients identified in the CC field, wherein the third instance of the email does not disclose the identities of the plurality of BCC-G recipients identified in the CC field, wherein the first, second, and third instances of the email contain the same subject line, body, and attachments.

12. The system of claim 11, wherein the mail server is further configured to:

require receipt of a predefined password as a condition to disclose the identities of the plurality of the BCC-G recipients to a respective one of the identified BCC-G recipients providing the predefined password.

* * * * *